United States Patent [19]

Shibata et al.

[11] Patent Number: 4,940,870
[45] Date of Patent: Jul. 10, 1990

[54] INDUCTION HEATING APPARATUS FOR INJECTION MOLDING MACHINE

[75] Inventors: Istuo Shibata, Hiratsuka; Osamu Fukahori, Yokohama, both of Japan

[73] Assignee: JU-OH, Inc., Japan

[21] Appl. No.: 313,510

[22] Filed: Feb. 22, 1989

[30] Foreign Application Priority Data

Feb. 25, 1988 [JP] Japan .................. 63-42540

[51] Int. Cl.⁵ .............................. H05B 6/40
[52] U.S. Cl. ..................... 219/10.491; 219/10.75; 219/10.79; 425/174.8 R; 425/549; 264/27
[58] Field of Search ............ 219/10.491, 10.492, 219/10.61 A, 10.57, 10.75, 10.79, 10.67; 425/174.8 R, 174.8 E, 174.6, 549; 264/27

[56] References Cited

U.S. PATENT DOCUMENTS

| | | | |
|---|---|---|---|
| 2,436,993 | 3/1948 | Fisher, Jr. | 425/174.8 R |
| 3,051,988 | 9/1962 | Baermann | 425/174.8 |
| 3,472,987 | 8/1966 | Viart | 219/10.41 |
| 3,562,472 | 2/1971 | Cannon et al. | 219/10.492 |
| 3,702,368 | 11/1972 | Hukin | 219/10.491 |
| 4,195,214 | 3/1980 | Gerber | 219/10.491 X |
| 4,549,051 | 10/1985 | Ness | 219/10.491 |
| 4,610,017 | 9/1986 | Bathie et al. | 373/156 |
| 4,726,751 | 2/1988 | Shibata et al. | 425/549 |

FOREIGN PATENT DOCUMENTS 61-197216  1/1986  Japan .
1302039  1/1973  United Kingdom ........... 219/10.492

Primary Examiner—Philip H. Leung
Attorney, Agent, or Firm—Mason, Fenwick and Lawrence

[57] ABSTRACT

The present invention provides a induction heating coil bobbin used to heat the hot runner in an injection molding machine, the bobbin comprising a substantially cylindrical body made of a metal or alloy having its low magnetic permeability, the bobbin body having at least one slit formed therein, the slit extending on the bobbin body between the opposite ends thereof through a predetermined length.

5 Claims, 2 Drawing Sheets

INDUCTION HEATING APPARATUS FOR INJECTION MOLDING MACHINE

BACKGROUND OF THE INVENTION

1. Field of the Invention

The present invention relates to a induction heating coil bobbin and more particularly to such a bobbin used to heat the hot runner in an injection molding machine at its hot runner.

2. Description of the Prior Art

There is known a so-called cold runner molding system wherein a mass of resin charged in a resin passage connecting between a molding machine nozzle and a mold cavity, that is, a so-called runner is cooled and solidified together with another mass of resin charged in the mold cavity. The solidified runner is thereafter removed together with the solidified product on mold opening. On the contrary, there is also known a hot runner type injection molding system wherein a mass of resin to be molded is cooled and solidified within the mold cavity while maintaining a runner molten. The runner in the molten state is reused in the next molding cycle.

In such a hot runner type injection molding system, a induction heating coil is used to heat and maintain the runner in its molten state, as disclosed in Japanese Laid-Open patent application No. 61-197216. The dielectric heating coil is normally mounted about a cylindrical bobbin and unitized by the use of a filler material such that the coil will not be deformed and can be easily positioned in place.

The bobbin used herein must be made of any suitable material that will not be heated under the action of magnetic flux from the induction heating coil and can withstand a raised temperature. In the prior art, ceramic materials were used to form the induction heating coil bobbins.

Since such a bobbin requires an increased accuracy in size, specialty ceramics must be used to form the induction heating coil bobbins. However, the specialty ceramics are expensive and difficult to be worked.

SUMMARY OF THE INVENTION

It is therefore an object of the present invention to provide a induction heating coil bobbin which can be formed of any one of inexpensive and easily workable metal materials without need of using the expensive and hardly workable specialty ceramics.

To this end, the present invention provides a dielectric heating coil bobbin used to heat the hot runner in an injection molding machine, said bobbin being characterized in that it comprises a substantially cylindrical body made of a metal or alloy having its low magnetic permeability, said body having at least one slit formed therein, said slit extending on said body between the opposite ends thereof through a predetermined length. It is desirable that one slit extends on said bobbin body along the length thereof from one end to the opposite end. For example, the bobbin body is formed of stainless steel.

Since the induction heating coil bobbin has a main body formed of a metallic material having its low magnetic permeability and having at least one slit formed therein and extending along the length of the bobbin, eddy current will flow along an increased circumferential path formed about the bobbin body by said slit as the magnetic flux from the induction heating coil passes through the bobbin body. This results in substantial increase of the resistance in the bobbin. Therefore, the magnetic flux will reach a member disposed within the bobbin body, that is, a tip wherein eddy current is created to heat the tip.

Since very little eddy current passes through the bobbin body, further, the bobbin body itself will be restricted on the heating. As a result, only the hot runner to be inherently heated can be effectively heated.

DETAILED DESCRIPTION OF THE PREFERRED EMBODIMENTS

The present invention will now be described in connection with preferred embodiments thereof with reference to the accompanying drawings.

Figure 1:
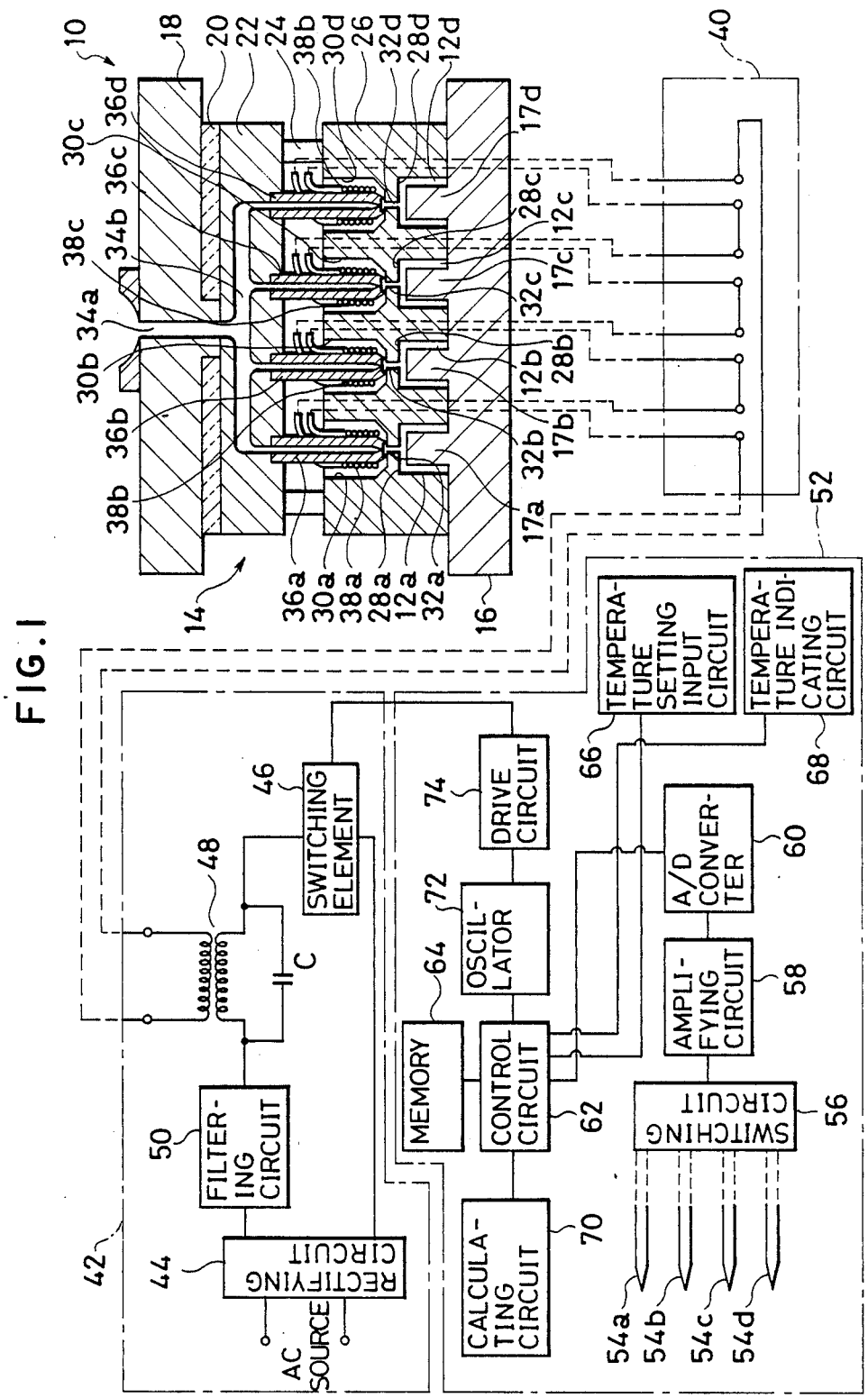
FIG. 1 is a schematic view of a hot runner type injection molding system incorporating one embodiment of a induction heating coil bobbin constructed according to the present invention.

Referring to FIG. 1, there is shown a hot runner type injection molding system into which a induction heating coil bobbin constructed according to the present invention is incorporated. The injection molding system comprises a mold assembly 10 having four mold cavities 12a, 12b, 12c and 12d. The mold assembly 10 comprises a stationary half 14 rigidly mounted on a stationary die plate in an injection molding machine (not shown) and a movable half 16 securely mounted on a movable die plate. When the movable half 16 is pressed against the stationary half 14, that is, when the mold assembly 10 is closed, the aforementioned four mold cavities 12a–12d will be formed between the stationary and movable halves 14 and 16. The stationary mold half 14 comprises a mounting plate 18 attached to the stationary die plate, a manifold block 22 rigidly mounted on the mounting plate 18 to locate heat insulation 20 therebetween, and a cavity plate 26 firmly mounted on the manifold block 22 to dispose a support block 24 therebetween.

The cavity plate 26 is provided with four recesses 28a, 28b, 28c and 28d respectively opened at the side thereof facing to the movable mold half 16. Each of the four recesses 28a–28d cooperates with the respective one of four cores 17a, 17b, 17c and 17d formed on the movable mold half 16 to form the respective one of the aforementioned four cavities 12a–12d. The cavity plate 26 also comprises four recesses 30a, 30b, 30c and 30d formed therein at the side opposite to the aforementioned recesses 28a–28d, that is, at the side facing to the manifold block 22. Each of the four recesses 30a–30d is aligned with the respective one of the recesses 28a–28d and opened at the side of the cavity plate 26 facing to the manifold block 22.

The stationary mold half 14 further comprises resin passages each of which connects the injection molding machine nozzle (not shown) with the mold cavities 12a–12d through gates 32a, 32b, 32c and 32d which are formed on the bottoms of the respective recesses 30a–30d. The resin passage comprises a so-called sprue portion 34a which may be connected directly with the nozzle of the molding machine and a so-called runner portion 34b divided into four sub-runners within the manifold block 22. The end of each of the sub runners in the runner portion 34b adjacent to the corresponding one of the gates 32a–32d is formed by the respective one of tubular tips 36a, 36b, 36c and 36d.

There is a induction heating coil unit 38a, 38b, 38c or 38d which is disposed about each of the tips 36a–36d. As will be described, each of the induction heating coil units 38a–38d may be energized by the high-frequency current to heat the corresponding tip, as will be described later.

The manifold block 22 also has any suitable heating means (not shown) for heating it up to a desired temperature.

Molten resin injected from the molding machine nozzle is charged into the respective mold cavities 12a–12d through the aforementioned resin passage. Normally, the cavity plate 26 and the movable mold half 16 are cooled. After the resin material charged in the mold cavities 12a–12d has been cooled and solidified, the movable mold half 16 is moved backwardly to open the mold assembly 10. Thereafter, a product molded in each of the mold cavities 12a–12d is separated from the stationary mold half 14 while being carried by the respective one of the cores 17a–17d on the movable mold half 16. At this time, there may be produced various undesirable phenomena, for example, such as a stringing between a gate and the corresponding product if the temperature of resin at a position near the corresponding gate is too high, a leakage of molten resin through the gate or gates when the mold is in its open position, or a solidification of resin near the gate or gates to prevent the next injection molding cycle if said temperature is too low. Accordingly, the temperature of resin near the gates 32a–32d must be maintained within a critical range of temperature between the undesirably high and low temperatures.

The induction heating coil units 38a–38d are connected in series with one another and also with a high-frequency power supply circuit 42 through connector means in a junction box 40. The power supply circuit 42 comprises a rectifying circuit 44 for rectifying AC current from a source to convert it into DC (pulsating) current, a switching element 46 for repeating its alternative opening and closing (ON and OFF) operation under the control of a temperature controlling circuit 52 which will be described, a transformer 48, a capacitor C connected in parallel to the primary side of the transformer 48 and a filter circuit 50. The four induction heating coil units 38a–38d are connected in series with the secondary side of said transformer 48.

The temperature controlling circuit 52 includes four temperature sensors 54a, 54b, 54c and 54d each of which is in contact with the respective one of said tips 36a–36d to detect its temperature. The output of each of the temperature sensor 54a–54d is applied sequentially to an amplifying circuit 58 through a switching circuit 56. After amplified, the output signal of the amplifying circuit 58 is supplied to an A/D converter 60 wherein the signal is converted into a digital signal which in turn is stored in a memory 64 under the control of a control circuit 62.

The control circuit 62 also is connected with a temperature setting input circuit 66 and a temperature indicating circuit 68. The temperature setting input circuit 66 is adapted to apply a tip temperature setting selected by a setting dial or the like to the control circuit 62. The selected temperature at the tips is then stored in the memory 64 under the control of the control circuit 62. The control circuit 62 causes a calculatory circuit 70 to obtain an average value in the temperature data from the respective temperature sensors 54a–54d stored in the memory 64, that is, the temperatures of the respective tips 36a–36d and to compare the obtained average value with the aforementioned temperature setting value. Depending on a difference between the average value and the temperature setting, the control circuit 62 controls an oscillator 72 to vary the output signal therefrom.

The power supply circuit 42 is such arranged that if the frequency is lower within a predetermined range of frequency, a higher power is supplied to the induction heating coil units 38a–38d. The control circuit 62 controls the oscillator 72 such that if the difference between the temperature setting value and the average value in the temperatures of the tips 36a–36d is larger, the oscillator 72 oscillates correspondingly at a lower frequency. The oscillator 72 is set to oscillate at a frequency ranged between 20 KHz and 50 KHz. The output signal of the oscillator 72 is amplified in current by a drive circuit 74 to form a drive signal for driving the switching element 46. When the switching element 46 is repeatedly opened and closed depending on the oscillating frequency in the oscillator 72, a current flows in the primary side of the transformer 48 while a high-frequency current is induced at the secondary side of the transformer 48. That high-frequency current is then supplied to the four induction heating coil units 38a–38d which are connected in series with the secondary side of the transformer 48. As each of the induction heating coil units 38a–38d receives the high-frequency current, the respective one of the tips 36a–36d in which that induction heating coil unit is mounted is heated by the action of electromagnetic induction. It is of course that the tips 36a–36d are formed of any one of suitable materials capable of being heated by the electromagnetic induction. Such materials are well-known in the art, but should be selected under the consideration in that the tips 36a–36d must withstand raised temperature and pressure. It is particularly desirable that one selects a material having a large mechanical strength even if the tips are heated to a raised temperature and a high magnetic permeability not varied depending on the variations of temperature. Such materials include hot molding materials SKD-61, SKD-62 and others.

The temperature controlling circuit 52 performs the repetitive comparison of the average in the actual temperatures at the tips 36a–36d from the temperature sensors 54a–54d with the temperature setting. If the average value is lower than the temperature setting, the oscillator circuit 72 will have its oscillating frequency increased as the difference between the average and the temperature setting decreases. As that oscillating frequency increases, the frequency in the current flowing the primary side of the transformer 48 also increases. As a result, the frequency in the current supplied to the induction heating coil units 38a–38d is also increased so as to reduce the power applied to the induction heating coil units 38a–38d. In other words, the temperature controlling circuit 52 is adapted to supply the induction heating coil units 38a–38d with an increased electric power if the actual temperatures at the tips 36a–36d are lower than the temperature setting and when the difference therebetween is relatively high. If the actual temperatures approaches the temperature setting, the electric power to be supplied is increased. In such a manner, the actual temperatures at the tips 36a–36d may be converged on the temperature setting. On the contrary, if the actual temperatures exceed the temperature setting, the electric power to be supplied is decreased at the rate depending on the magnitude of the difference between the averaged temperature and the temperature setting. Similarly, the actual temperatures at the tips may approach the temperature setting. In this connection, the temperature indicating circuit 68 is adapted to indicate the actual temperatures at the tips 36a–36d, the temperature setting and other factors.

Since the tips 36a–36d themselves generate heat in the illustrated embodiment, the thermal response thereof may be improved in comparison with the prior art wherein similar tips were heated by separate heater means under the heat transfer. This enables the tips to control in temperature with an improved accuracy and without any time delay due to the ringing or heat transfer.

Figure 2:
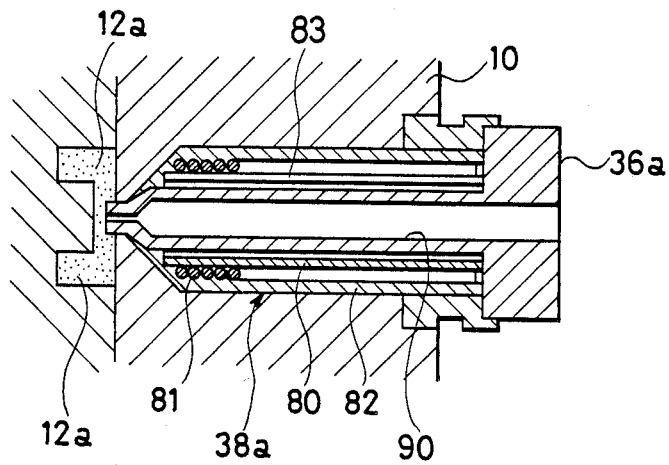
FIG. 2 is a cross-sectional view illustrating the construction of a hot runner portion of the injection molding system into which one induction heating coil bobbin according to the present invention is incorporated.

Since the induction heating coil units 38a–38d are common in construction, only the induction heating coil unit 38a typical of the remaining coil units 38b, 38c and 38d will be described in construction with reference to FIG. 2. FIG. 2 shows a tip having its gate that is connected directly with one mold cavity in the mold assembly.

The induction heating coil unit 38a is of a cylindrical configuration and comprises a bobbin body 80 disposed in the coil unit 38a at its center, a induction heating coil 81 wound about the bobbin body 80 and a coil casing 82 for housing the induction heating coil 81. These components are unitized by the use of any suitable filler material. In such an arrangement, the induction heating coil unit may be maintained at its desired configuration and easily positioned relative to the corresponding tip.

The tip 36a is disposed in the interior of the induction heating coil unit 38a at its center, as shown. The induction heating coil unit 38a is firmly mounted within the mold assembly 10 by the use of any suitable means such that the positional relationship between the gate of the tip 36a and the induction heating coil 81 can be always maintained. In the illustrated embodiment, the tip 36a is in the form of a pipe-like member which is provided with a through-hole 90 defining a resin passageway adjacent to the gate opening.

In the light of workability and manufacturing cost, the bobbin body 80 is preferably formed of a metal or alloy material having its high resistance and its low magnetic permeability, such as stainless steel. Merely by forming the bobbin body 80 of any one of such metal or alloy materials into a cylindrical configuration, there is created a problem in that the amount of eddy current generated in the tip 36a is reduced, resulting in undesirable heat generation in the tip 36a.

Figure 3:
FIG. 3 is a perspective view exemplifying a bobbin usable in the induction heating coil according to the present invention.

As seen from FIG. 3, the present invention provides a slit 83 formed axially in the bobbin body 80 and extending along the length thereof. This slit 83 functions to increase the amount of eddy current in the tip 36a such that the latter can be more efficiently heated by the eddy current. It is believed that this is because the circumferential eddy current path about the external surface of the bobbin body 80 is increased in its substantial length by the presence of the slit 83 to increase the resistance in the bobbin body 80.

The induction heating coil 81 consists of a core formed of any metal having its good conductivity and its high corrosion resistance such as silver alloy, copper and the like and an insulating cover about the core. Depending on the size and other factors of the tip, the coil includes several turns to several tens turns about the tip. Since heat is transferred from the manifold block 22 to the rearward end of the tip 36a while heat is taken from the forward end of the same tip to the cavity plate 26, the induction heating coil 81 is desirably located as near the tip 36a as possible, such that the magnetic flux from the induction heating coil 81 will be concentrated into the forward end of the tip 36a.

Figure 4:
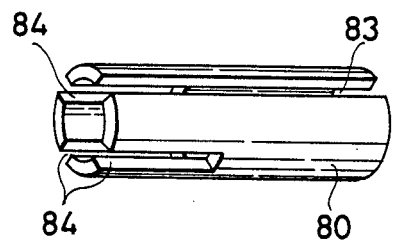
FIG. 4 is a perspective view of a modified bobbin for the induction heating coil.

For the same reason, it is desirable that the forward end of the bobbin body 80 includes a plurality of partial slits 84 formed therein and extending from the forward end of the bobbin body toward the rearward end thereof, in addition to the complete slit 83, as shown in FIG. 4. Such additional slit sections 84 further increase the substantial length of the eddy current path at the forward end of the bobbin body 80 to provide a further increased resistance. As a result, the thermal loss due to the eddy current in the bobbin can be further reduced to provide a further improved efficiency of heating at the tip itself.

Although the aforementioned embodiments have been described as to the complete slit extending along the entire length of the bobbin body, the complete slit may be replaced by a partial slit extending only to the midway of the length of the bobbin body 80. It is also desirable that the wall thickness of the bobbin body is formed as thin as possible to increase the resistance in the bobbin body 80 and thus decrease the magnetic permeability therein.

We claim:

1. An induction heating apparatus for using a hot runner material in an injection molding machine, the induction heating apparatus comprising:
   a substantially cylindrical body wound with a coil, the substantially cylindrical body made of a metal or alloy having low magnetic permeability, a first portion of the substantially cylindrical body being in contact with a mold, the substantially cylindrical body being provided with:
   (a) at least one long slot which extends along the entire length of the substantially cylindrical body; and
   (b) at least one short slot which extends from the first portion of the substantially cylindrical body toward a middle of the substantially cylindrical body.

2. The induction heating apparatus of claim 1, wherein the substantially cylindrical body is made of stainless steel.

3. The induction heating apparatus of claim 1, wherein one or more of the at least one short slots has a length less than half the length of the at least one long slot.

4. The induction heating apparatus of claim 3, wherein one or more of the at least one short slots has a length which is approximately two-fifths the length of the at least one long slot.

5. The induction heating apparatus of claim 1, wherein the substantially cylindrical body is supplied with a current having a frequency in the range of approximately 20 KHz through approximately 50 KHz.

* * * * *